(12) United States Patent  
Fourney

(10) Patent No.: US 8,100,252 B2
(45) Date of Patent: Jan. 24, 2012

(54) OBJECT REPOSITIONING SYSTEM

(75) Inventor: Matthew L. Fourney, Laurel, MD (US)

(73) Assignee: Laitram, LLC, Harahan, LA (US)

( * ) Notice: Subject to any disclaimer, the term of this patent is extended or adjusted under 35 U.S.C. 154(b) by 390 days.

(21) Appl. No.: 12/518,583

(22) PCT Filed: Dec. 14, 2007

(86) PCT No.: PCT/US2007/025543
§ 371 (c)(1),
(2), (4) Date: Jun. 10, 2009

(87) PCT Pub. No.: WO2008/076329
PCT Pub. Date: Jun. 26, 2008

(65) Prior Publication Data
US 2010/0096242 A1  Apr. 22, 2010

Related U.S. Application Data

(60) Provisional application No. 60/869,980, filed on Dec. 14, 2006.

(51) Int. Cl.
*B65G 43/00* (2006.01)
(52) U.S. Cl. .... 198/444; 198/454; 198/455; 198/457.06
(58) Field of Classification Search ................. 198/443, 198/444, 453, 454, 455, 457.06, 597
See application file for complete search history.

(56) References Cited

U.S. PATENT DOCUMENTS

| 4,054,201 A * | 10/1977 | Rollinger ...................... 198/455 |
| 4,879,735 A * | 11/1989 | Owens ............................ 378/57 |
| 4,930,615 A * | 6/1990 | Nash ............................. 198/411 |
| 5,074,400 A * | 12/1991 | Focke et al. .................... 198/415 |
| 6,328,300 B1 * | 12/2001 | Stefan et al. ...................... 271/2 |
| 6,435,332 B1 * | 8/2002 | Price ............................ 198/375 |
| 6,597,760 B2 * | 7/2003 | Beneke et al. .................. 378/57 |
| 6,607,065 B2 * | 8/2003 | Peppel .......................... 198/367 |
| 7,055,672 B2 * | 6/2006 | Holmgren .................... 198/444 |
| 7,832,452 B2 * | 11/2010 | Desch ness .................. 160/123 |

* cited by examiner

*Primary Examiner* — Douglas Hess
(74) *Attorney, Agent, or Firm* — Thomas, Kayden, Horstemeyer & Risley, LLP

(57) ABSTRACT

In one embodiment, an object repositioning system configured for use in association with a conveyor includes opposed gates positioned over the conveyor and oriented in an initial partially-closed position in which the gates define an opening through which objects conveyed by the conveyor can pass that is narrower than a width of the conveyor, a locking mechanism configured to lock the gates in the initial partially-closed position, and an actuation mechanism configured to release the locking mechanism to enable the gates to pivot when an object conveyed by the conveyor contacts both of the gates at the same time.

27 Claims, 7 Drawing Sheets

OBJECT REPOSITIONING SYSTEM

CROSS-REFERENCE TO RELATED APPLICATION

This application is related to copending U.S. Provisional Application entitled "Synchronized Gate System" Ser. No. 60/869,980, filed on Dec. 14, 2006, which is entirely incorporated herein by reference. This application also claims priority to, and the benefit of, PCT Application No. PCT/US2007/25543 entitled, "Object Repositioning System," filed on Dec. 14, 2007, which is entirely incorporated herein by reference.

BACKGROUND

Terrorism and crime are potential security risks at airports and on airplanes. To mitigate these risks, passengers and cargo are screened for potentially dangerous material, such as bombs and weapons, prior to being placed on an airplane. For example, cargo is often screened by a scanning machine, such as an x-ray machine, that is positioned over a conveyor belt on which the cargo travels. Typically, an opening into the scanning machine is narrower than the conveyor belt, such that cargo that is too wide or off-center on the belt is unable to enter the scanning machine.

Off-center cargo can be directed into the scanning machine using guide rails. Although such guide rails effectively reposition most cargo, some cargo, such as duffel bags, tends to ride the guide rail through the scanning machine opening and then to shift back to the edge of the belt once the support of guide rail is no longer provided. When such cargo is scanned from overhead by the scanning machine, only a partial image of the entire piece of cargo may result. When this occurs, the cargo normally must be removed from the conveyor belt and manually searched by airport security personnel.

Cargo that is wider than the opening into the scanning machine may block the opening, causing subsequent cargo to accumulate on the conveyor belt. When the opening into the scanning machine is blocked, airport security procedures typically prescribe removing all of the cargo that accumulated on the conveyor belt and manually searching each piece by hand.

Manual searching of the type identified above consumes undue time of airport security personal and delays cargo from being loaded onto the airplane, thereby increasing the cost of airline travel. It can therefore be appreciated that a need exists for a solution that eliminates or at least reduces the need for such manual searching.

BRIEF DESCRIPTION OF THE FIGURES

The present disclosure may be better understood with reference to the following figures. Matching reference numerals designate corresponding parts throughout the figures, and components in the figures are not necessarily to scale.

DETAILED DESCRIPTION

Described herein are embodiments of an object repositioning system that can be positioned adjacent a conveyor that feeds a scanning machine configured to scan objects, such as airline cargo, for potentially dangerous material. In some embodiments, the object repositioning system can lock gates of the system in a partially-closed position so that cargo can be "funneled" through an opening between the gates and repositioned nearer the center of the conveyor. Such repositioning increases the likelihood of the cargo entering an opening of the scanning machine that may be narrower than the conveyor. In further embodiments, the gates can be unlocked when cargo having dimensions that exceed the width of the opening between the gates, so that the cargo can push through the gates and continue traveling on the conveyor. Once the conveyor moves such larger cargo past the gates, the gates can be returned to the original partially-closed position and re-locked.

Figure 1:
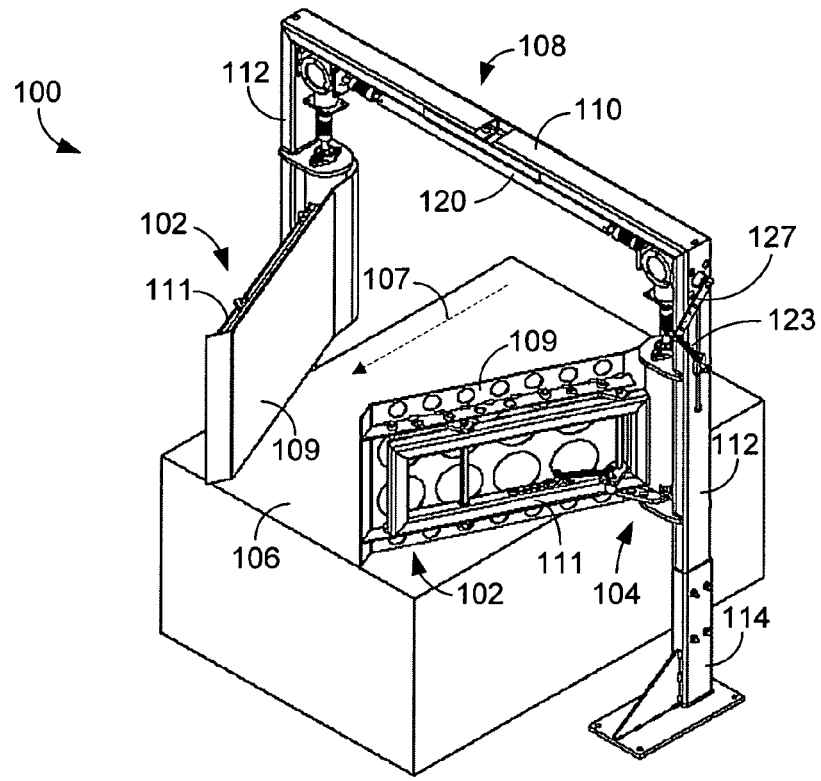
FIG. 1 is a perspective view of an embodiment of an object repositioning system.

FIG. 1 is a perspective view of an embodiment of a object repositioning system 100. The object repositioning system 100 includes gates 102 and a locking mechanism 104 that can be controlled to intermittently lock and unlock the gates. As shown in FIG. 1, the object repositioning system 100 includes two substantially planar opposed gates 102, although greater, fewer, and/or differently shaped gates could be used. A conveyor belt 106 of a conveyor that travels in a direction of belt travel 107 passes underneath the gates 102, typically without contacting the gates, although cargo (not shown) positioned on the conveyor belt may contact the gates. The gates 102 are pivotally mounted on a frame 108 that is configured to support the object repositioning system 100 above the conveyor belt 106. In the illustrated embodiment, the frame 108 includes a horizontal member 110, two vertical members 112, and two supports 114. The horizontal member 110 is positioned above and extends across the conveyor belt 106. The vertical members 112 are positioned on opposite sides of the conveyor belt 106 and extend from the horizontal member 110 to the ground. The supports 114 are coupled to lower ends of the vertical members 112 and stabilize the frame 108 and therefore the entire system 100.

Figure 3:
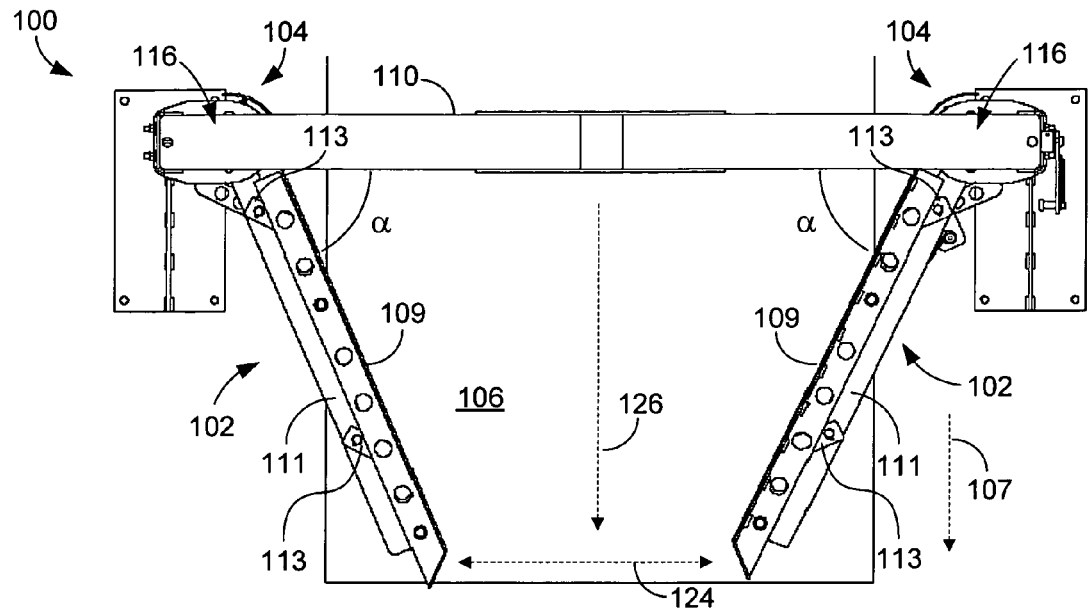
FIG. 3 is a top view of the object repositioning system of FIG. 1.

FIG. 3 is a top view of the object repositioning system 100 of FIG. 1. As shown in FIG. 3, each gate 102 is located on an opposite side of the conveyor belt 106 from the other gate in an initial, locked position in which the gates are partially open so as to define a passage or opening 124 through which cargo may pass but fixed so as not pivot or rotate. When in an unlocked position described below, each gate 102 pivots or rotates about a pivot point 116 in a downstream direction away from the other gate so as to widen the opening 124. In some embodiments, the gates 102 may be configured to rotate synchronously, such that the rotation of one gate effects substantially equal but opposite rotation of the other gate. In addition, a spring 123 is provided to return the gates 120 to their initial, locked position.

Figure 4:
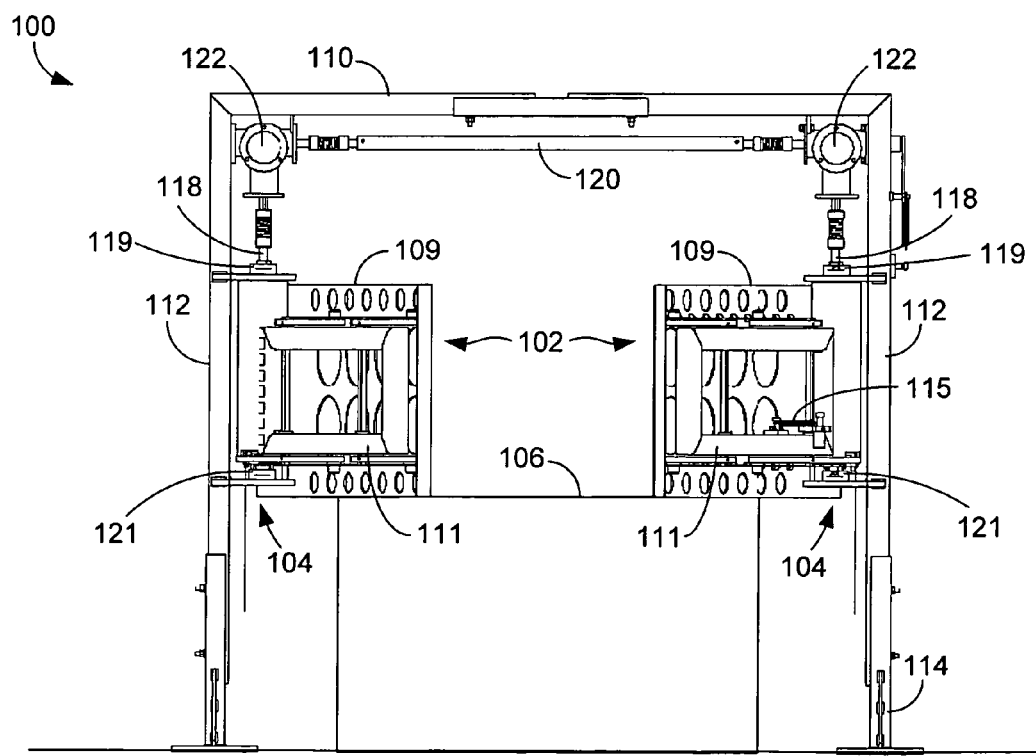
FIG. 4 is a front view of the object repositioning system of FIG. 1.

Synchronous movement of the gates 102 can be enabled by coupling the gates together. For example, the gates 102 can be coupled together as shown in FIG. 4, which is a front view of the object repositioning system 100. As shown in FIG. 4, each gate 102 has a pivot shaft 118 that extends through upper and lower ball bearing supports 119 and 121 mounted to the vertical members 112 of the frame 108. An overhead mounted torque shaft 120 that extends in the direction of the horizontal member 110 of the frame 108 engages right-angle gear boxes 122, such as a right-handed gear box and a left-handed gear box, coupled to the pivot shafts 118. Through such linkage, pivoting or rotation of one of the gates 102 causes opposite pivoting or rotation of the other gate.

Figure 2:
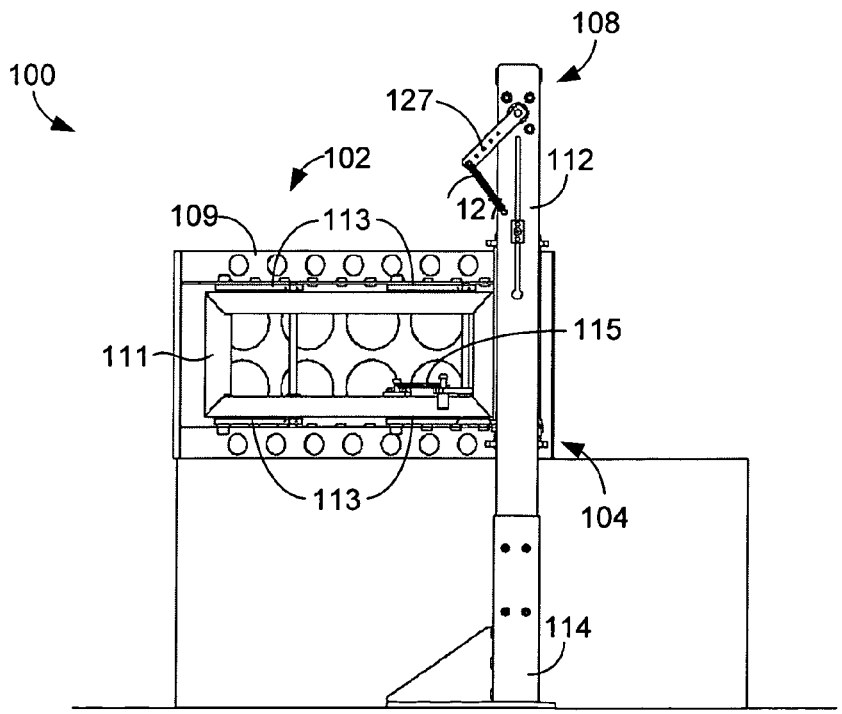
FIG. 2 is a side view of the object repositioning system of FIG. 1.

The synchronous gate system 100 further includes an actuation mechanism that controls the locking mechanism 104. In the embodiment illustrated in FIGS. 1-4, the actuation mechanism comprises a trigger plate 109 provided on the interior face of each gate that can be individually triggered or activated when cargo presses against the trigger plate. As indicated most clearly in FIGS. 2 and 3, the trigger plates 109 are pivotally mounted to frames 111 of the gates 102 with linking members 113 and are biased by springs 115 toward an extended position (only one spring shown in FIGS. 3 and 4). When forces are imposed upon the trigger plates 109 by cargo, the plates displace or collapse inwardly toward their respective gate frames 111 (i.e., in a laterally outward direction relative to the conveyor belt 106). The force necessary to displace the trigger plates 109 may be low, for example as little as two or more pounds of force. As described below, displacement of both of the trigger plates 109 at the same time triggers unlocking of the normally locked gates 102.

When the gates 102 are in the initial, locked position, the gates are partially closed such that, as shown in FIG. 3, each of the gates forms an acute angle, α, relative to a transverse direction of the conveyor belt 106 (i.e., perpendicular to the direction of belt travel 107) to define the opening 124. By way of example, the angle, α, can be approximately 55 degrees and the width of the opening 124 can be less than the width of the opening into the scanning machine. For example, in embodiments in which the width of the opening into the scanning machine is about 29 inches, the width of the opening 124 between the gates 102 may be about 20 inches, for reasons described below. When the gates 102 are unlocked, however, they can be pivoted outward by cargo traveling on the conveyor belt 106 so that cargo wider than the opening 124 can pass.

As described above, the locking mechanism 104 controls locking and unlocking the gates 102 responsive to the state of the trigger plates 109. In some embodiments, the locking mechanism 104 comprises two independent locking mechanisms, one provided for each gate 102. In such a case, when neither trigger plate 109 is activated (i.e., cargo engages neither gate 102) or when only one such trigger plate is activated (i.e., cargo engages only one gate 102), at least one of the locking mechanisms is engaged so as to retain the gates 102 in the partially closed position shown in FIG. 3. When both trigger plates 109 are activated (i.e., cargo engages both gates 102 at the same time), however, the locking mechanisms of each gate 102 unlocks so that the gates can rotate against the biasing force applied by the springs 123.

The operation of the object repositioning system 100 will now be described. Cargo that is to be scanned is placed on the conveyor belt 106, typically spaced apart from neighboring cargo along the direction of conveyor belt travel 107. In other words, the cargo is positioned so that adjacent cargo is located in the direction of belt travel 107 but not in a direction perpendicular to the direction of belt travel. The conveyor belt 106 conveys the cargo in the direction of belt travel 107 toward the scanning machine, which may be centered over a center line 126 of the conveyor belt (see FIG. 3). The opening into the scanning machine may be narrower than a width of the conveyor belt 106, and therefore cargo traveling on the conveyor belt may not be positioned to enter the opening into the scanning machine. For example, the opening into the scanning machine may be about 29 inches wide, and the conveyor belt 106 may be about 39 inches wide.

Figure 5A:
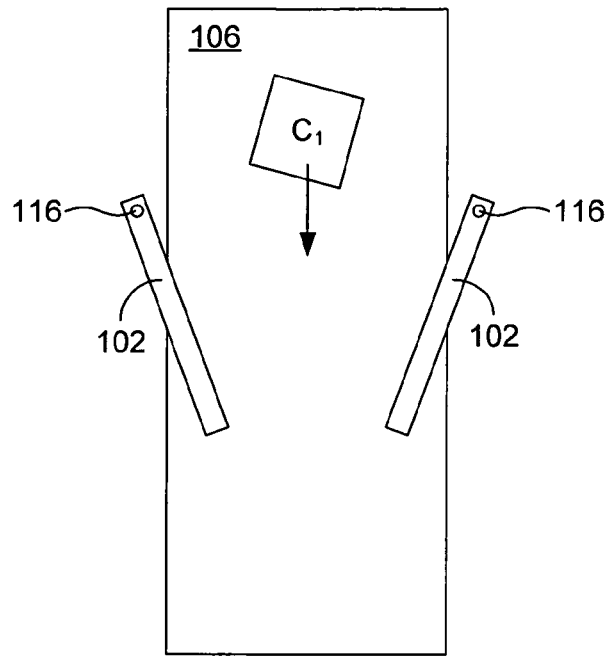
FIGS. 5A and 5B are schematic top views of gates of the object repositioning system of FIG. 1, illustrating a first piece of cargo passing through the gates.
Figure 5B:
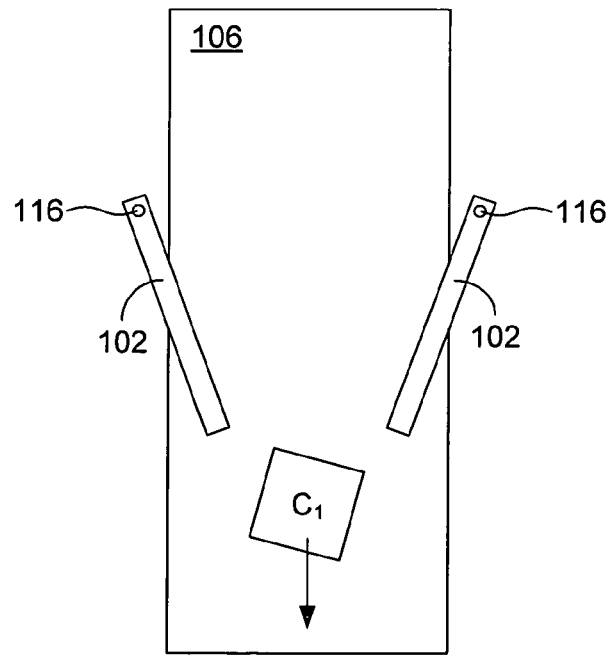

As depicted in FIGS. 5A and 5B, which show a piece of cargo $C_1$ at different points in time during conveyance, cargo generally centered on the conveyor belt 106 and smaller than the opening 124 may pass through the gates 102 without contacting either of the gates. In such a case, the cargo is already positioned to enter the scanning machine and repositioning by the object repositioning system 100 is not necessary.

Figure 6A:
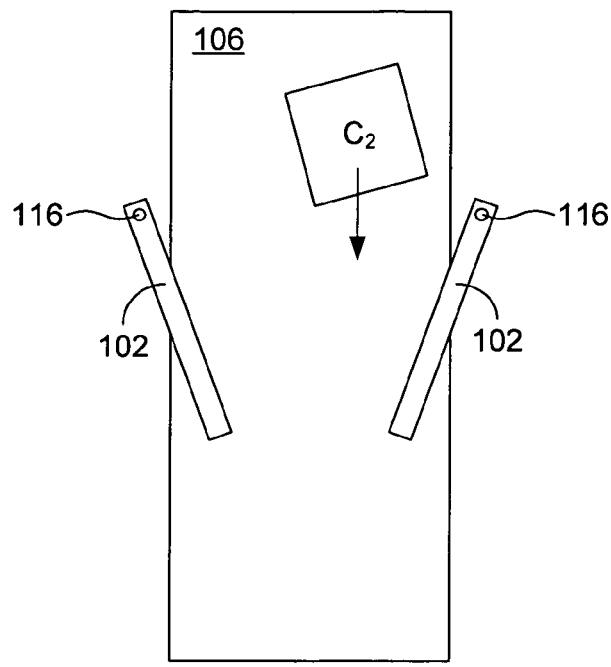
FIGS. 6A and 6B are schematic top views of gates of the object repositioning system of FIG. 1, illustrating a second piece of cargo passing through the gates.
Figure 6B:
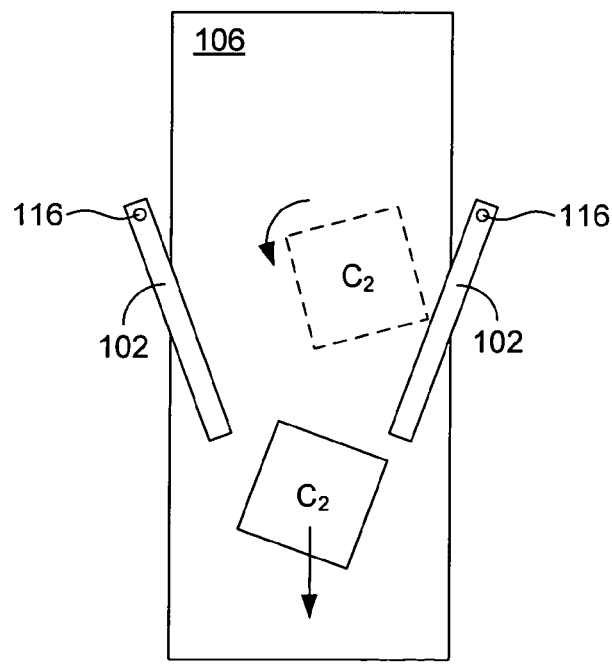

As depicted in FIG. 6A, other (e.g., larger) cargo $C_2$ may be sized and/or positioned on the conveyor belt 106 such that it will not pass through the opening 124 without contacting the gates. In such a case, the cargo may contact only one of the gates 102. When the cargo contacts only one gate 102, the locking mechanism 104 retains the gates in the partially-closed position, and the cargo slides or "rolls" along the inner face of the contacted gate 102 so as to be redirected toward the center of the conveyor belt 106 and through the opening 124, as indicated in FIG. 6B. As a result, the cargo is transitioned into a position at which the conveyor belt 106 will transport the cargo through the opening of the scanning machine.

Figure 7A:
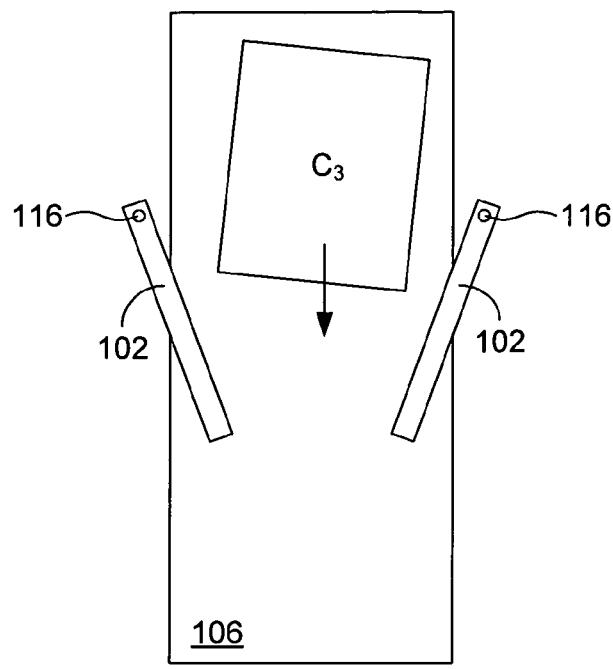
FIGS. 7A-7D are schematic top views of gates of the object repositioning system of FIG. 1, illustrating a third piece of cargo passing through the gates.
Figure 7B:
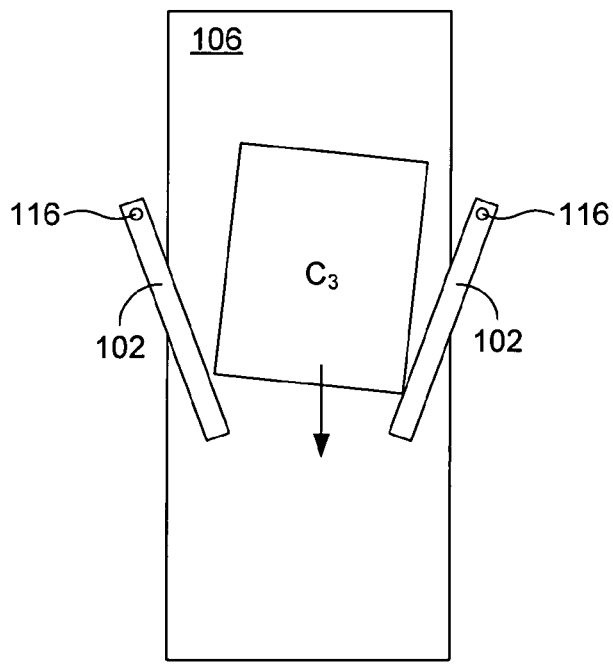
Figure 7C:
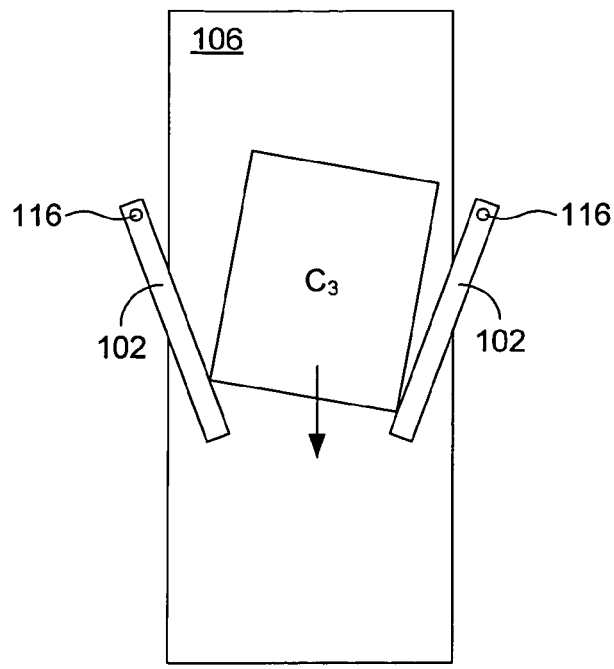
Figure 7D:
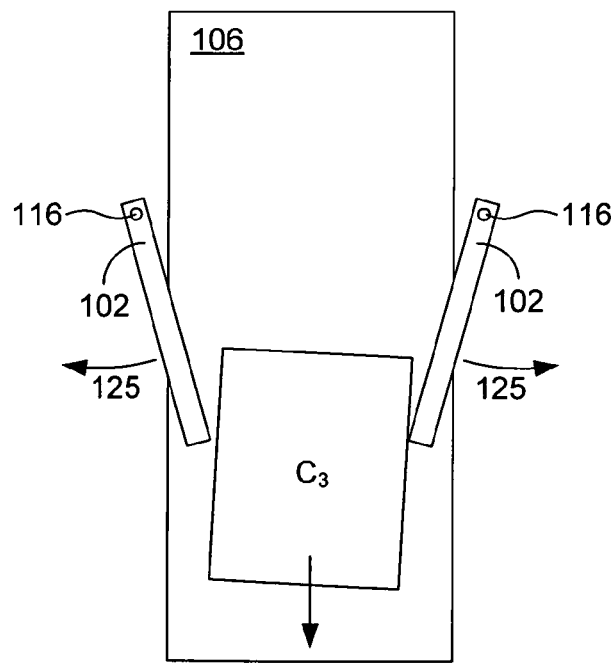

As depicted in FIG. 7A, still other cargo $C_3$ may be sized and/or positioned to eventually come into contact with both gates 102 at the same time as the conveyor belt 106 moves forward. In such a case, the cargo may first contact one of the gates while in its locked state, as indicated in FIG. 7B, and then shift towards the center of the conveyor belt 106 to also come into contact with the other gate while also still in its locked state, as indicated in FIG. 7C. At the latter point, both trigger plates 109 are activated at the same time so as to cause the locking mechanism 104 to release and enable the gates 102 to rotate. Notably, while the cargo must be in contact with both trigger plates 109 at the same time, the cargo does not need to first make contact with both plates simultaneously for the locking mechanism 104 to be released. The cargo can then, as indicated in FIG. 7D, push against the gates 102 to cause them to rotate away from each other about their respective pivot points 116 in the directions of arrows 125 and allow the cargo to pass. In embodiments in which the gates 102 are configured to move in synchronicity, the rotation of one of the gates causes substantially equal and opposite rotation of the other gate. Therefore, as depicted in FIG. 7D, the "left" side gate 102 opens to the same extent as the "right" side gate 102 (in the orientation shown in that figure) even though the cargo only contacts the right side gate. Once the cargo passes the gates 102, the spring 123 returns the gates to the partially-closed position by pulling on a lever 127 coupled to the shaft 120, and the locking mechanism 104 relocks the gates. For example, the return of the gates 102 to the partially-closed position can reset the sliding locking cams into the locked position.

In embodiments in which the opening 124 between the gates 102 is narrower than the opening into the scanning machine, such as in embodiments in which the opening between the gates is 20 inches and the opening into the scanning machines is 29 inches, the scanning machine will be able to capture a complete scan of the cargo, including non-rigid bags such as duffel bags, which may tend to shift in a direction perpendicular to the direction of belt travel 107 once having passed through the opening of the scanning machine.

Figure 8A:
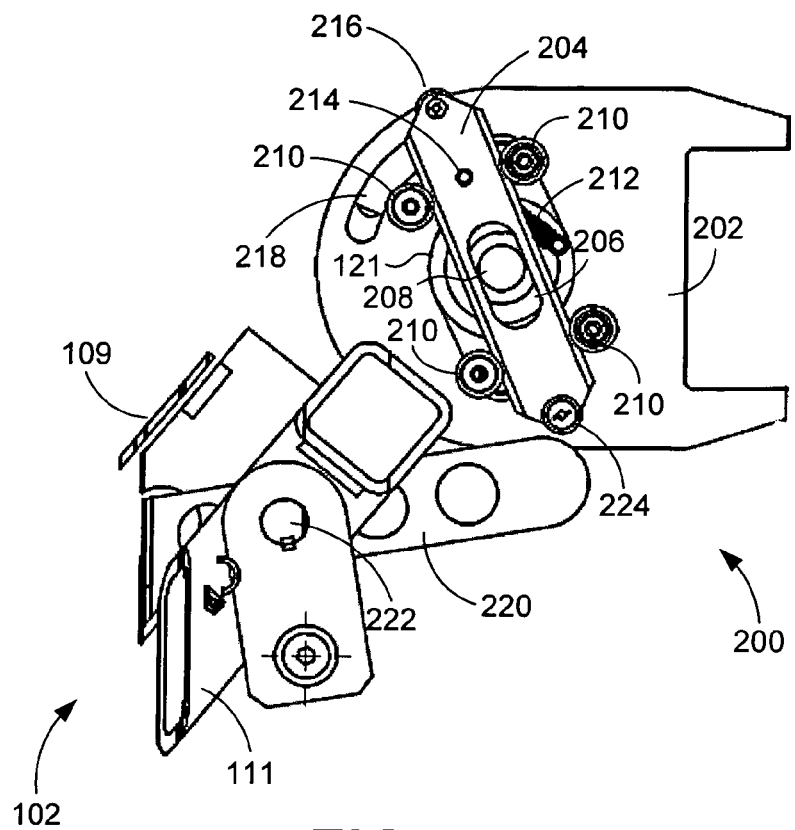
FIG. 8A is a top detail view of an embodiment of a locking mechanism that can be used in the object repositioning system of FIG. 1.
Figure 8B:
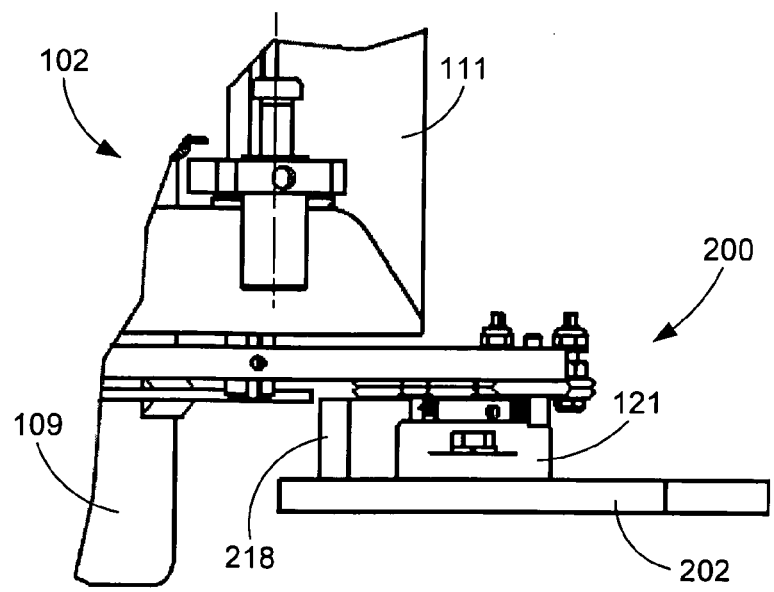
FIG. 8B is a side detail view of the locking mechanism shown in FIG. 8A.

FIGS. 8A and 8B illustrate an embodiment of a locking mechanism 200 that can be used to lock one of the gates 102 of the object repositioning system 100. As indicated in the figures, the locking mechanism 200 is positioned adjacent a gate 102 (e.g., the right-side gate in FIG. 4) of the object repositioning system 100. In addition, the locking mechanism 200 is positioned adjacent, for example positioned on top of, the lower ball bearing support 121, which is supported by a mounting plate 202 adapted for attachment (e.g., welding) to one of the vertical members 112 of the frame 108. With particular reference to FIG. 8A, included in the locking mechanism 200 is an elongated sliding cam 204 having an elongated inner slot 206 that is sized and configured to receive a pin 208. Positioned about the periphery of the cam 204 are guide wheels 210. Through the provision of the slot 206 and the guide wheels 210, the cam 204 can travel back and forth (generally up and down in the orientation of FIG. 8A) relative to the pin 208.

Also included in the locking mechanism 200 is a spring 212 that is connected at one end to the ball bearing support 121 and to a pin 214 provided on the cam 204 at the other end. The spring 212 is held in tension such that the cam 204 is pulled toward an initial, retracted position in which the pin 208 is located at an end of the slot 206 (not shown). In the orientation of FIG. 8A, such a position would result in the pin 208 being located in the top end of the slot 206. With reference to both FIGS. 8A and 8B, when the cam 204 is in the retracted position, a lock roller 216 provided at a first end of the cam 204 aligns with an abutment member 218, which prevents the cam, and therefore the gate 102 with which the locking mechanism 200 is associated, from pivoting or rotating.

With reference again to FIG. 8A, the gate 102 includes an actuator lever 220 that is connected to the trigger plate 109. The actuator lever 220 is further mounted to a pivot pin 222 about which the lever can pivot or rotate. When the trigger plate 109 is compressed in the manner described in the foregoing, the actuator lever 220 is caused to pivot or rotate toward the locking mechanism 200 (counterclockwise in the orientation of FIG. 8A.). The actuator lever 220 engages a roller 224 provided at a second end of the cam 204 and drives the cam toward an extended position against the force of the spring 212. When the cam 204 is extended far enough, the lock roller 216 clears the abutment member 218 such that the cam and the associated gate 102 can pivot or rotate (counterclockwise in the orientation of FIG. 8A). As the gate 102 returns back toward its initial position, the lock roller 216 follows the outer periphery of the abutment member 218 until it clears an end of the abutment member and the cam 204 is drawn back to the retracted position under the force of the spring 212. At that point, the gate 102 is back in the initial position and the locking mechanism is again locked so that the gate cannot pivot or rotate.

While particular embodiments of a object repositioning system have been disclosed in detail in the foregoing description and figures for purposes of example, those skilled in the art will understand that modifications may be made without departing from the scope of the disclosure. All such modifications are intended to be included within the scope of the present disclosure.

Although trigger plates have been described as an example of an actuation mechanism that controls the locking mechanism, in other embodiments the locking mechanism can be controlled using one or more sensors that send a release command signal to the locking mechanism when it is sensed that cargo contacts both gates.

Although a torque shaft and gear boxes have been described as an example of a mechanism that enables synchronous movement of the gates, in other embodiments the synchronous movement mechanism can comprise a cable and pulley system, one or more roller chains, or one or more timing belts.

I claim:

1. An object repositioning system configured for use in association with a conveyor, the object repositioning system comprising:
   opposed gates positioned over the conveyor and oriented in an initial partially-closed position in which the gates define an opening through which objects conveyed by the conveyor can pass that is narrower than a width of the conveyor;
   a locking mechanism configured to lock the gates in the initial partially-closed position; and
   an actuation mechanism configured to release the locking mechanism to enable the gates to pivot when an object conveyed by the conveyor contacts both of the gates at the same time, wherein the gates are not motor driven and pivot only in response to forward movement of the object along the conveyor.

2. The system of claim 1, wherein the opposed gates comprise a pair of opposed gates.

3. The system of claim 1, wherein the opposed gates each forms an acute angle with a transverse direction of the conveyor when the gates are in the initial partially-closed position.

4. The system of claim 1, wherein each gate is mounted on a shaft about which each gate can pivot.

5. The system of claim 1, further comprising a linkage coupled to the gates that is configured to enable synchronous movement of the gates when the locking mechanism is released.

6. The system of claim 5, wherein the linkage comprises gear boxes coupled to shafts on which the gates are mounted and a torque shaft that extends between the gear boxes, wherein rotation of one of the gates causes substantially equal and opposite rotation of the other gate.

7. The system of claim 1, wherein the locking mechanism comprises a first locking mechanism associated with a first gate and a second locking mechanism associated with a second gate.

8. The system of claim 7, wherein the first and second locking mechanisms each comprise a cam that impedes rotation of its associated gate when placed in a first position and enables rotation of its associated door when placed in a second position.

9. The system of claim 8, wherein the actuation mechanism comprises first and second actuation mechanisms associated with the first and second gates, respectively, each of the first and second actuation mechanisms comprising an actuation lever configured to move its associated cam from the first position to the second position.

10. The system of claim 1, wherein the actuation mechanism comprises trigger plates provided on interior faces of the gates, wherein the locking mechanism is released when each trigger plate is activated.

11. The system of claim 10, further comprising linking members with which the trigger plates are pivotally mounted to frames of the gates and springs that bias the trigger plates toward an extended position, wherein each trigger plate is configured to displace inward toward its associated gate frame against the force of its associated spring when an object applies force against the trigger plates.

12. The system of claim 1, further comprising a spring that returns the gates to the initial partially-closed position after an object that released the locking mechanism has passed the object repositioning system.

13. The system of claim 12, wherein the locking mechanism is configured to automatically re-lock once the gates have returned to the initial partially-closed position.

14. An object repositioning system configured for use in association with a conveyor, the object repositioning system comprising:
- a pair of opposed gates mounted on pivot shafts and positioned over the conveyor, the gates being oriented in an initial partially-closed position in which the gates define an opening through which objects conveyed by the conveyor can pass that is narrower than a width of the conveyor;
- a locking mechanism associated with each gate, each locking mechanism being configured to lock its associated gate while in the initial partially-closed position;
- an actuation mechanism associated with each gate, each actuation mechanism being configured to release the locking mechanism of its associated gate to enable the gate to pivot when an object conveyed by the conveyor contacts the gate, wherein the gates are not motor driven and pivot only in response to forward movement of the object along the conveyor; and
- a synchronous movement linkage to which both gates are coupled, the synchronous movement linkage being configured to control the gates so that the gates can only pivot in synchrony with each other such that when the locking mechanism of one of the gates has been released, the gate will not be able to pivot unless the locking mechanism of the other gate has also been released.

15. The system of claim 14, wherein the first and second locking mechanisms each comprise a cam that impedes rotation of its associated gate when placed in a first position and enables rotation of its associated gate when placed in a second position.

16. The system of claim 15, wherein the actuation mechanisms each comprise an actuation lever configured to move the cam of its associated locking mechanism from the first position to the second position.

17. The system of claim 16, wherein the actuation mechanisms each comprise a trigger plate provided on interior faces of the gates, wherein compression of the trigger plates causes movement of the actuation levers.

18. The system of claim 15, further comprising a spring that returns the gates to the initial partially-closed position after an object that released the gates has passed the object repositioning system.

19. The system of claim 18, wherein the locking mechanisms are configured to automatically re-lock once the gates have returned to the initial partially-closed position.

20. A method for repositioning objects, the method comprising:
- conveying objects with a conveyor toward an object repositioning system;
- limiting passage of the objects to an initial opening defined by opposed gates of the object repositioning system, the initial opening being narrower than a width of the conveyor; and
- releasing the gates when an object having a dimension greater than the width of the initial opening presses against each gate at the same time such that the gates can pivot outward under the force of the object to increase the width of the opening and enable the object to pass
- wherein the gates are not motor driven and pivot only in response to forward movement of the object along the conveyor.

21. The method of claim 20, wherein limiting passage of the objects comprises locking the gates such that they cannot pivot.

22. The method of claim 20, wherein releasing the gates comprises releasing a locking mechanism configured to lock the gates in the initial partially-closed position.

23. The method of claim 22, wherein releasing a locking mechanism comprises releasing the locking mechanism using an actuation mechanism integrated with the gates.

24. The method of claim 23, wherein releasing the locking mechanism using an actuation mechanism comprises releasing the locking mechanism when trigger plates provided on interior faces of the gates are activated by forces applied by the object at the same time.

25. The method of claim 20, further comprising enabling the gates to pivot in synchrony when released.

26. The method of claim 20, further comprising returning the gates to an initial partially-closed position after the object has passed the object repositioning system.

27. The method of claim 26, further comprising automatically locking the gates after they have returned to the initial partially-closed position.

* * * * *